United States Patent
Müller et al.

(10) Patent No.: US 9,771,219 B2
(45) Date of Patent: Sep. 26, 2017

(54) CONVEYOR BELT WITH HIGH FLEXIBILITY AND AT THE SAME TIME HIGH FLAME RESISTANCE

(71) Applicant: ContiTech Transportbandsysteme GmbH, Hannover (DE)

(72) Inventors: Georg Müller, Köln (DE); Daniel Vazquez-Maggio, Northeim (DE)

(73) Assignee: ContiTech Transportbandsysteme GmbH, Hannover (DE)

(*) Notice: Subject to any disclaimer, the term of this patent is extended or adjusted under 35 U.S.C. 154(b) by 30 days.

(21) Appl. No.: 15/026,837

(22) PCT Filed: Aug. 4, 2014

(86) PCT No.: PCT/EP2014/066672
§ 371 (c)(1),
(2) Date: Apr. 1, 2016

(87) PCT Pub. No.: WO2015/051935
PCT Pub. Date: Apr. 16, 2015

(65) Prior Publication Data
US 2016/0289003 A1  Oct. 6, 2016

(30) Foreign Application Priority Data
Oct. 10, 2013  (DE) .......... 10 2013 111 190

(51) Int. Cl.
*B65G 15/38*  (2006.01)
*B29D 29/06*  (2006.01)
(Continued)

(52) U.S. Cl.
CPC .......... *B65G 15/38* (2013.01); *B29D 29/06* (2013.01); *B32B 7/02* (2013.01); *B32B 25/08* (2013.01);
(Continued)

(58) Field of Classification Search
CPC ........ B65G 15/08; B65G 15/38; B65G 15/40; B65G 2207/22; B32B 7/02; B32B 25/08;
(Continued)

(56) References Cited

U.S. PATENT DOCUMENTS 4,410,082 A * 10/1983 McGinnis .............. B65G 15/34
198/818
5,083,658 A * 1/1992 Siwersson .............. B65G 15/08
198/819

(Continued)

FOREIGN PATENT DOCUMENTS

DE  3329848 A1  2/1984
DE  40 14 850 A1  11/1991
(Continued)

OTHER PUBLICATIONS

Office Action dated on Jul. 11, 2016 of Chinese National Stage—Chinese Patent Application No. 2014900011029.

*Primary Examiner* — Gene Crawford
*Assistant Examiner* — Keith R Campbell

(57) ABSTRACT

A conveyor belt, in particular a pouch conveyor belt, with a first layer, which comprises a material with high flexibility, and to a conveying installation, in particular a pouch conveying installation, with such a conveyor belt.

15 Claims, 2 Drawing Sheets

(51) Int. Cl.
*B32B 27/22* (2006.01)
*F27D 3/00* (2006.01)
*F27D 3/06* (2006.01)
*B32B 7/02* (2006.01)
*B32B 25/08* (2006.01)
*B32B 25/18* (2006.01)
*B65G 15/08* (2006.01)
*B65G 15/40* (2006.01)
*F27D 3/12* (2006.01)

(52) U.S. Cl.
CPC .............. *B32B 25/18* (2013.01); *B32B 27/22* (2013.01); *B65G 15/08* (2013.01); *B65G 15/40* (2013.01); *F27D 3/0024* (2013.01); *F27D 3/0033* (2013.01); *F27D 3/06* (2013.01); *B32B 2250/03* (2013.01); *B32B 2250/40* (2013.01); *B32B 2307/3065* (2013.01); *B32B 2413/00* (2013.01); *B65G 2207/22* (2013.01); *F27D 2003/121* (2013.01)

(58) Field of Classification Search
CPC . B32B 25/18; B32B 27/22; B32B 2307/3065; B32B 2413/00

USPC .......................................... 198/819
See application file for complete search history.

(56) References Cited

U.S. PATENT DOCUMENTS

| | | | | |
|---|---|---|---|---|
| 6,540,069 | B2* | 4/2003 | Tschantz | B65G 15/08 |
| | | | | 198/819 |
| 7,909,719 | B2* | 3/2011 | Leighton | B65G 15/34 |
| | | | | 198/847 |
| 9,388,693 | B2* | 7/2016 | Whelan | B65G 15/60 |
| 2009/0233746 | A1 | 9/2009 | Leighton et al. | |
| 2010/0044189 | A1* | 2/2010 | Alexander | B32B 25/02 |
| | | | | 198/846 |

FOREIGN PATENT DOCUMENTS

| | | | | |
|---|---|---|---|---|
| GB | 2125731 | A | 3/1984 | |
| JP | WO 2013190976 | A1 * | 12/2013 | ............ B65G 15/38 |
| WO | 89/12593 | A1 | 12/1989 | |
| WO | 2010/031692 | A1 | 3/2010 | |
| WO | 2011/110220 | A1 | 9/2011 | |

\* cited by examiner

CONVEYOR BELT WITH HIGH FLEXIBILITY AND AT THE SAME TIME HIGH FLAME RESISTANCE

CROSS REFERENCE TO RELATED APPLICATIONS

This application is a continuation application of international patent application PCT/EP2014/066672, filed Aug. 4, 2014, designating the United States and claiming priority from German application 10 2013 111 190.4, filed Oct. 10, 2013, and the entire content of these applications is incorporated herein by reference.

FIELD

The invention relates to a conveyor belt, in particular a pouch conveyor belt, with a first layer, which comprises a material with high flexibility, and to a conveying installation, in particular a pouch conveying installation, with such a conveyor belt.

BACKGROUND

In the field of conveying technology, among the conveyor belts that are known are pouch conveyor belts, which are also referred to as pouch conveyors or bag conveyors or are known under the trade name Sicon® belts. They derive their name from the structure of the conveyor belt, which transports the material it conveys in a closed manner by being folded into a loop or pouch. The ends of the belt have profiles with vulcanized-in reinforcing elements, such as for example steel cables, and serve for the guiding of the belt by means of the guide and support rollers. The reinforcing elements take over the tensile forces of the belt. They are arranged one above the other in a vertical axis. The middle part of the pouch conveyor belt that carries the material being conveyed is of highly elastic rubber and is free from reinforcing elements and other stiffening elements.

On account of this structural design of the pouch conveyor belt and the corresponding plant technology, small curve radii are made possible, as a result of which transfer stations are avoided and the pouch conveyor belt can transport the material being conveyed in a closed manner from the feed point to the discharge point. This avoids environmental impact of the material being conveyed, for example due to dust, spillage etc., and conversely protects the material being conveyed from environmental influences, such as for example wind, rain, solar irradiation, etc. The belt is also closed on the return side. The reinforcing elements arranged one above the other in the vertical axis ensure that they always have the same radius, even in curves of up to 180°. These properties result in a highly dynamic conveying system that makes small radii, steep gradients and high levels of acceleration possible, for example for use in a confined space, such as in factories, on ships, in steelworks, etc. Examples of such pouch conveyor belts or pouch conveying installations are disclosed for example by WO 89/12593 and EP 0 765 287 B1.

However, these properties of the conveying system also result in corresponding requirements for the dynamic properties of the corresponding pouch conveyor belt with regard to its structure and its materials. Thus, the pouch conveyor belt must be designed in such a way that it withstands undamaged for as long as possible the dynamic requirements due to acceleration and retardation as well as bending and compression, since the failure of a conveying installation leads to great problems and costs, as does the exchange of a conveyor belt, which has to be performed over the entire length of the conveying installation. In this respect, long-term loading tests have shown that the dynamic loads, in particular due to the bending and compression of the conveyor belt as a result of the opening and closing during loading and unloading, cause damage in the form of microcracks to occur on the surface of the pouch conveyor belt, and then penetrate into the material of the belt. These microcracks occur in particular at the bending point of the pouch conveyor belt, i.e. at the lowest point of the loop, which bears the greatest load in terms of the weight of the material being conveyed and is subjected to the greatest loading as a result of the opening and closing of the conveyor belt, and tend to occur on the outer side of the pouch conveyor belt, i.e. on the side facing away from the material being conveyed.

In order to satisfy these dynamic requirements, rubbers, such as for example butyl or nitrile or chloroprene rubber mixes, are generally used for pouch conveyor belts. In addition, these rubber mixes often also contain between 10 and 60 phr of plasticizer.

Apart from the dynamic requirements, there may at the same time also be further requirements for pouch conveyor belts, such as for example a certain flame resistance, which in the case of use underground for example may be prescribed for safety reasons.

With regard to the flame resistance, chloroprene or styrene rubber mixes are particularly well suited.

DE 10 2009 043 904 A1 describes a troughed conveyor belt with a vulcanizable rubber mix on the basis of inter alia chloroprene rubber (CR), which is distinguished by its high flame, weathering and aging resistance, in particular for conveyor belts for use underground.

CN 202642653 U describes a tubular conveyor belt for underground coal mining with an aramid structural layer, which is arranged between an upper flame-resistant bonding layer and a lower flame-resistant bonding layer.

CN 102642693 A describes a flame-resistant tubular conveyor belt for coal mines with a skeleton layer, which is arranged between an upper flame-resistant bonding layer and a lower flame-resistant bonding layer.

These flame-resistant troughed and tubular conveyor belts share the common feature that these types of conveyor belts are subjected to much lower dynamic loads in comparison with pouch conveyor belts, because the tensile forces of the belts are transmitted through reinforcing elements that extend in the longitudinal direction, i.e. in the conveying or running direction, and are generally arranged in a distributed manner over the width of the conveyor belt. As a result of this structure, smaller gradients, curve radii and accelerations apply to troughed and tubular conveyor belts than to pouch conveyor belts, so that on the one hand there is no need to use materials that satisfy dynamic requirements as in the case of pouch conveyor belts, and on the other hand flame-resistant materials such as those described above can be used. Since, however, on account of their comparatively high filler content, flame-resistant materials do not have the necessary flexibility to satisfy the dynamic requirements of a pouch conveyor belt, these materials cannot be transferred from the flame-resistant troughed and tubular conveyor belts to pouch conveyor belts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a pouch conveyor belt is provided which includes a first layer having a material with high flexibility, and a second layer comprising a material with a high flame resistance. In some cases, the first layer faces a running side of the pouch conveyor belt, and the second layer face a carrying side of the pouch conveyor belt. Pouch conveyor belts may further include a third layer comprising a material with high flexibility.

In some cases, the first layer and the third layer are spaced apart from one another by the second layer. The third layer includes the same material as the first layer, while in some others, the third layer includes a different material than the first layer.

In another aspect of the disclosure, pouch conveying installation includes a plurality of guide and/or support rollers, and a pouch conveyor belt having a first layer with a material having high flexibility, and a second layer having a material with a high flame resistance.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
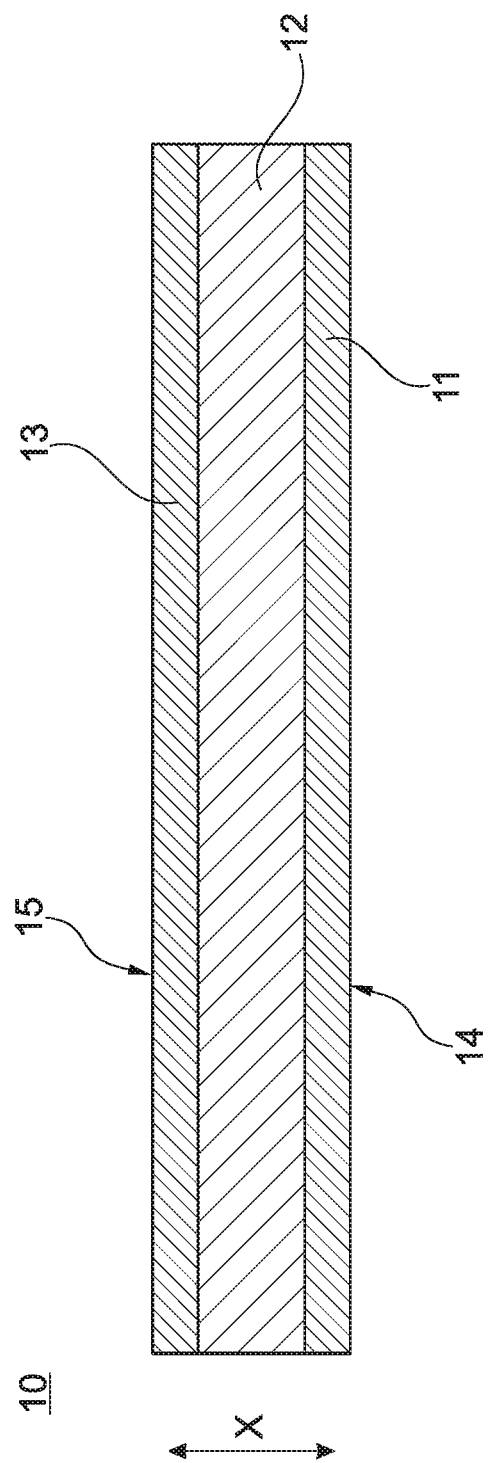
FIG. 1 shows a schematic sectional representation of a conveyor belt according to the present invention.

An object of the present invention is therefore to provide a conveyor belt of the type described at the beginning that both satisfies high dynamic requirements and is flame-resistant. In particular, it is intended to avoid crack formations caused by dynamic loads on the surfaces of the conveyor belt while at the same time achieving flame resistance.

The object is achieved according to the invention by a conveyor belt with the features according to claim 1 and a conveying installation with the features according to claim 10. Advantages developments are described in the sub-claims.

Consequently, the present invention relates to a conveyor belt, in particular a pouch conveyor belt, with a first layer, which comprises a material with high flexibility. The conveyor belt is characterized in that it also has a second layer comprising a material with a high flame resistance.

With regard to the conveyor belt according to the invention, high flexibility should be understood as meaning that it withstands dynamic requirements to which for example pouch conveyor belts are subjected. In comparison with other applications for belts, these dynamic requirements comprise high levels of acceleration and retardation as well as bending and compression, for example during the loading and unloading of the conveyor belt. The dynamic requirements can be tested for example by a dynamic bending test. Here there is a correlation between the number of bending loads in the test and the longevity of the material mix in use.

For instance, a sheet of a conveyor belt that is clamped in a predetermined way in the test stand must withstand a predetermined number of load changes without tearing. Experience shows that, if the predetermined number of reversed bending stresses is not achieved, failure of the sheet before the promised warranty period has elapsed cannot be ruled out, depending on the loading during use. Thus, only a mix or a sheet that passes this test is given clearance for further tests. Furthermore, pieces of belt that are for example 10 m long can be tested in a test stand that represents a small conveying installation. On this test stand, the conveyor belt must describe a particularly large number of curves.

Likewise, the opening and closing of the conveyor belt are tested. Experience has shown that, if unsuitable, failure of the sheet after only a short time may likewise be observed here.

The present invention is based on the realization that, in the case of conveyor belts for dynamic loads, materials that are correspondingly flexible but have only a low flame resistance have previously been used. When it has been intended for these requirements to be achieved in the case of conveyor belts, flame-resistant materials have previously been used for the outer layers, i.e. surfaces of the conveyor belt. This however is contrary to the object of making a conveyor belt for dynamic applications flame-resistant, because the flame resistance of these layers is achieved by a high filler content, but this reduces the flexibility of these layers.

According to the invention, therefore, two separate layers are chosen, to be specific a first highly flexible layer and a second flame-resistant layer, the properties of which can be respectively obtained and adjusted by the suitable materials. The combination of these two layers to form a conveyor belt then allows these properties to be used at the same time in the case of a conveyor belt which can preferably be used as a pouch conveyor belt.

Preferably, the first layer is facing the running side of the conveyor belt and the second layer is facing the carrying side of the conveyor belt. Since conveyor belts in general and pouch conveyor belts in particular are bent in or troughed toward the material being conveyed, i.e. toward the carrying side, higher dynamic loads occur on the outer side, i.e. the running side, of the conveyor belt than on the carrying side. It is therefore advantageous also to provide the first flexible layer on the running side of the conveyor belt.

Preferably, the conveyor belt also has a third layer comprising a material with high flexibility. This further flexible layer allows the overall flexibility of the conveyor belt to be increased further.

Preferably, the first layer and the third layer are spaced apart from one another by the second layer. In other words, the second flame-resistant layer is embedded between the two flexible layers as in the case of a sandwich. This is advantageous because the dynamic loads are greater on the outside than in the core of the conveyor belt, and therefore the flexible layers can also be provided on the two sides of the flame-resistant core in order to be able to withstand these dynamic loads.

Preferably, the third layer comprises the same material as the first layer or a different material than the first layer. If the same materials are used, costs can thereby be reduced, because only one material is bought, stored and used. In particular, the production process is simplified, because only one kind of material has to be handled for both sides of the flame-resistant core. If different materials are used, the flexibility of each layer can be differently adjusted. Furthermore, the overall properties of the layers can be differently influenced and made to suit different application cases.

Preferably, the first layer forms the running side of the conveyor belt and/or the third layer forms the carrying side of the conveyor belt. It is advantageous in this respect that, as a result, the flexible layers can form the outer layers, which are also exposed to the highest dynamic loads.

Preferably, the second layer has a thickness of 4 mm to 15 mm and/or the first layer and/or the third layer has a thickness of 0.1 mm to 10 mm. In these ranges of the thickness of the layers, they can effectively bring their respective properties to bear in customary application cases. The thickness of the entire sheet of the conveyor belt in this case preferably lies between 4.2 mm and 35 mm. Such conveyor belts generally have a width of between 0.5 m and 5.0 m and can be used with lengths of up to 10 000 m.

Preferably, the material of the second layer comprises fire-resistant compounds. For example, halogenated hydrocarbons, hydroxides, silicates, special graphites or metal oxides may be used for this. Particularly ZnO, MgO, Sb1-2O1-3, Al(OH)3, partly or completely hydrated silicates may be used here. Especially the use of metal oxides or hydroxides allows the use of halogenated compounds to be limited to a minimum or rendered completely superfluous. This is meaningful because the use of halogenated hydrocarbons is to be minimized for reasons of environmental protection. Moreover, the metal oxides can be produced more easily. This at the same time reduces the costs. Furthermore, on account of the lower dynamic requirements in comparison with the first layer and/or the third layer, the mix no longer has to contain halogenated plasticizers. The same advantages apply here.

Preferably, the material of the first layer and/or the third layer comprises non-halogenated plasticizers. On account of the thin first and/or third layer, they primarily have to satisfy the dynamic requirements. The fire-related requirements are largely to entirely met by the second layer. This makes it possible for expensive, flame-resistant halogenated plasticizers to be partially or completely replaced by non-halogenated plasticizers. The corresponding advantages have already been stated. Consequently, an SBR, NR, CR, NBR, butyl or butadiene rubber mix may be used in the first and/or third layer. With preference, a plasticizer-containing, flame-protected CR rubber mix is used here.

According to a further aspect of the present invention, it also relates to a conveying installation, in particular a pouch conveying installation, with a plurality of guide and/or support rollers and a conveyor belt as described above.

Figure 2:
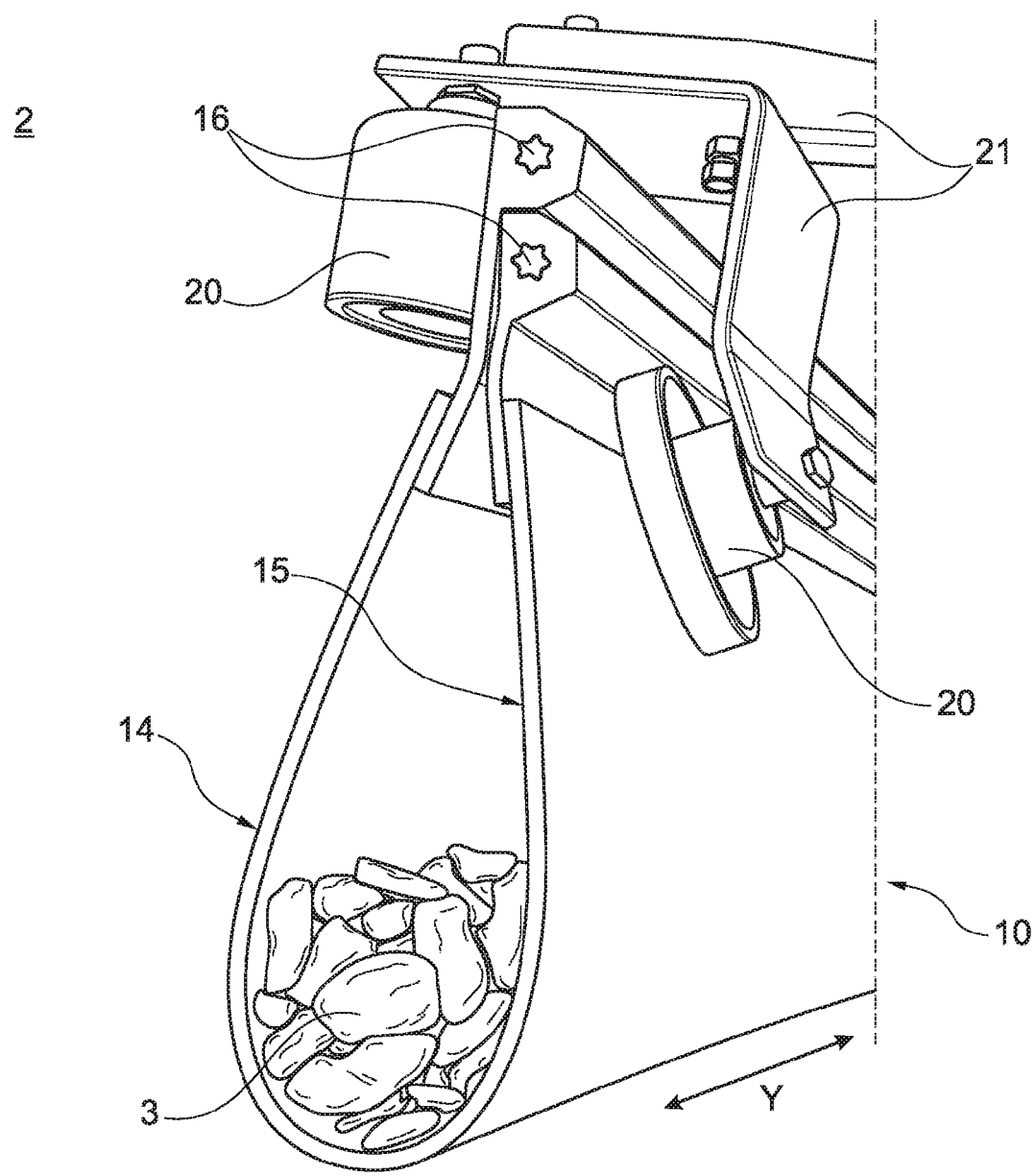
FIG. 2 shows a perspective schematic representation of a pouch conveyor belt.

An exemplary embodiment and further advantages of the invention are explained below in conjunction with the following figures, in which:

FIG. 1 shows a schematic sectional representation of a conveyor belt according to the present invention; and FIG. 2 shows a perspective schematic representation of a pouch conveyor belt.

FIG. 1 shows a schematic sectional representation of a conveyor belt 10 according to the present invention. The conveyor belt 10 has a first layer 11, which at the same time forms the running side 14 of the conveyor belt 10. The conveyor belt 10 also has a second layer 12, which is facing the carrying side 15 and is arranged on the first layer 11. Arranged on the second layer 12 is a third layer 13, which at the same time forms the carrying side 15 of the conveyor belt 10. This structure of the layers 11, 12, 13 extends in the direction X of the thickness of the conveyor belt.

The first and third layers 11, 13 comprise a material with high flexibility and the second layer 12, embedded in between, has high flame resistance. It is hereby achieved according to the invention that it is possible to provide a flame-resistant conveyor belt 10 which, as a result of the outer flexible layers 11, 13, at the same time has altogether comparatively high flexibility, because the outer layers 11, 13 are also exposed to higher dynamic loads.

FIG. 2 shows a perspective schematic representation of a pouch conveyor belt 10. On account of its high flexibility in spite of increased flame resistance, the conveyor belt 10 according to FIG. 1 is very suitable for being used as a pouch conveyor belt 10. In this application case of FIG. 2, the pouch conveyor belt 10 has at each of its edges a reinforcing element 16 in the form of a steel cable 16. Over these edges, the pouch conveyor belt 10 runs over guide and/or support rollers 20 of a pouch conveying installation 2. The guide and/or support rollers 20 are held and positioned by installation parts 21. In the loaded state, the pouch conveyor belt 10 has material being conveyed 3 inside it on the carrying side 15. This material is transported in the pouch conveying installation 2 in the conveying direction Y, which corresponds to the running direction Y of the pouch conveyor belt 10. This direction also corresponds to the longitudinal direction Y of the pouch conveyor belt 10.

In the state of the closed pouch conveyor belt 10 in which it has been bent around into the form of a pouch, the lowest point of the cross section of the pouch conveyor belt 10 experiences the greatest changes in form, and consequently also the highest dynamic loading, due to the opening and closing of the pouch conveyor belt 10. This is further increased in the loaded state by the weight of the material being conveyed 3 and the resultant greater bending. As a result, first cracks extending substantially in the longitudinal direction Y occur at this point, i.e. the lowest point of the cross section, on the running side 14, and with increasing use of the pouch conveyor belt 10 may penetrate into the layers 11, 12, 13 and finally lead to tearing through of the pouch conveyor belt 10.

It is therefore advantageous to use the structure according to the invention of a conveyor belt 10 in the application case of a pouch conveying installation 2, since this can have the effect of reducing the crack formation of the pouch conveyor belt 10 while at the same time achieving flame resistance.

LIST OF DESIGNATIONS

Part of the Description

X thickness of the conveyor belt 10 or of the layers 11, 12, 13
Y longitudinal direction, conveying direction, running direction of the conveyor belt 10
10 conveyor belt, pouch conveyor belt
11 first layer of the conveyor belt 10
12 second layer of the conveyor belt 10
13 third layer of the conveyor belt 10
14 running side of the conveyor belt 10
15 carrying side of the conveyor belt 10
16 reinforcing element
2 conveying installation, pouch conveying installation
20 guide and/or support rollers
21 installation parts
3 material being conveyed

The invention claimed is:

1. A pouch conveyor belt comprising:
a first layer comprising a material with high flexibility;
a second layer comprising a flame resistant material; and,
a third layer comprising a material with high flexibility;

wherein the first layer and the third layer are spaced apart from one another by the second layer.

2. The pouch conveyor belt of claim 1, wherein the first layer faces a running side of the pouch conveyor belt, and wherein the second layer face a carrying side of the pouch conveyor belt.

3. The pouch conveyor belt of claim 1, wherein the third layer comprises the same material as the first layer.

4. The pouch conveyor belt of claim 1, wherein the third layer comprises a different material than the first layer.

5. The pouch conveyor belt of claim 1, wherein the first layer forms a running side of the pouch conveyor belt.

6. The pouch conveyor belt of claim 1, wherein the third layer forms a carrying side of the pouch conveyor belt.

7. The pouch conveyor belt of claim 1, wherein the first layer forms a running side of the pouch conveyor belt, and wherein the third layer forms a carrying side of the pouch conveyor belt.

8. The pouch conveyor belt of claim 1, wherein the second layer has a thickness of 4 mm to 15 mm.

9. The pouch conveyor belt of claim 1, wherein the first layer has a thickness of 0.1 mm to 10 mm.

10. The pouch conveyor belt of claim 1, wherein the third layer has a thickness of 0.1 mm to 10 mm.

11. The pouch conveyor belt of claim 1, wherein the second layer has a thickness of 4 mm to 15 mm, and wherein the first layer has a thickness of 0.1 mm to 10 mm.

12. The pouch conveyor belt of claim 1, wherein the material of the second layer comprises fire-resistant compounds.

13. The pouch conveyor belt of claim 1, wherein the material of the first layer and comprises non-halogenated plasticizers.

14. The pouch conveyor belt of claim 1, wherein the material of the third layer comprises non-halogenated plasticizers.

15. A pouch conveying installation comprising a plurality of guide and/or support rollers, and a pouch conveyor belt comprising a first layer comprising a material with high flexibility, a second layer comprising a flame resistant material, and a third layer comprising a material with high flexibility, wherein the first layer and the third layer are spaced apart from one another by the second layer.

* * * * *